2,856,385

POLYESTER-AMIDES OF N,N'-BIS-(p-CARBOXY-BENZOYL) ALKYLENEDIAMINES, GLYCOLS AND DIAMINES

John Van Den Berghe and Jack L. R. Williams, Rochester, N. Y., assignors to Eastman Kodak Company, Rochester, N. Y., a corporation of New Jersey No Drawing. Application May 10, 1956
Serial No. 583,944

3 Claims. (Cl. 260—75)

This invention relates to highly polymeric linear polyester-amides and is particularly concerned with polyester-amides of decreased crystallinity and increased moisture absorption characteristics obtained by the condensation of an N,N'-bis(p-carboxybenzoyl)alkylenediamine, preferably in ester form, with a glycol and a diamine.

In Laakso and Williams Serial No. 504,107, filed April 26, 1955, a very useful group of polyesters containing internal amide linkages and characterized by unusually regular structures are disclosed. These condensation polymers result from the condensation of one or more glycols with an N,N'-bis(p-carboxybenzoyl) alkylenediamine, preferably in ester form, to give polyesters which have internal amide linkages but which have properties resembling the polyesters rather than the polyester-amides. The presence of the amide linkages in the preformed dicarboxylate monomer prevents color formation, breakdown of the amide linkages, and also obviates competing polyester and polyamide reactions such as are present when the usual polyester amides are formed by co-condensation of a diamine, a dicarboxylic acid and a glycol. Similar polyesters of regular structure containing internal amide linkages are disclosed in Reynolds and Laakso Serial No. 504,101, filed April 26, 1955. The polymers disclosed in these applications are of considerable utility for both film and fiber applications. In particular, the polymers can be extruded into optically clear films which are highly useful as photographic film support. As with the other well known polyesters, these polymers show a high degree of crystallization after heat treatment and form oriented articles of great strength and high melting point.

In some cases, however, it is desirable to increase the moisture absorption of such polymers and also to decrease the degree of crystallinity in order to make the polymers more useful for coating applications, subbing of film supports made from these polymers, and fiber applications wherein a higher degree of moisture absorption and dyeability is desirable.

It is accordingly an object of this invention to provide new and improved highly polymeric linear polyester-amides. It is a further object of this invention to provide polyester-amides wherein the polymer contains internal amide linkages in the dicarboxylate component and also contains amide linkages from co-condensation of a diamine. Another object of the invention is to provide new and improved amine-modified polyesters of a glycol and an N,N'-bis(p-carboxybenzoyl)alkylenediamine. Other objects will be apparent from the description and claims which follow.

These and other objects are attained by means of this invention which, in its preferred embodiments, comprises highly polymeric linear polyester-amides of an N,N'-bis (p-carboxybenzoyl)alkylenediamine wherein the alkylene group contains 2–10 carbon atoms, a glycol containing 2–10 carbon atoms and a diamine containing 2–18 carbon atoms.

The modified polymers embodying this invention are prepared according to the process described in Laakso and Williams Serial No. 504,107 except that from 2 to 60 mole percent of the glycol used in the condensation is replaced by diamine as defined herein, whereby a polyester-amide polymer is formed rather than a polyester as described by Laakso and Williams. Similarly, the diamine can be used to replace a portion of the glycol in preparing compounds in accordance with the disclosure of Reynolds and Laakso Serial No. 504,101.

The inclusion of the diamine in the reaction mixture varies the properties of the resulting polymer quite markedly. In general, increasing quantities of diamine in the polymerization mixture causes decreasing crystallinity in the polymer and at the same time increases the water susceptibility of the polymer. Depending upon the diamine employed, the inherent viscosity and melting point will also be affected to varying degrees. In practicing the invention, any of the diamines containing 2–18 carbon atoms can be employed including the alkylenediamines, the aromatic diamines such as p-phenylene diamine, m-phenylene diamine, p-biphenyl diamine, 4,4'-amino-bis phenylene alkylenes, and aralkylene diamines such as p-phenylene diethylamine and the like. The diamines which are preferably employed are the alkylenediamines, and particularly those containing 2–6 carbon atoms such as ethylene diamine, trimethylene diamine, tetramethylene diamine and hexamethylene diamine. The diamine can be used to replace either a part or all of the glycol in the condensation, but the polymers embodying this invention are those wherein the diamine is present in an amount sufficient to modify the properties of the polymer but insufficient to render the polymer highly insoluble. Generally speaking, the inclusion of 2–60 mole percent of diamine based on the N,N'-bis (p-carboxybenzoyl) alkylenediamine gives the modified polymers of greatest utility.

Similarly, any of the well known glycols containing 2–10 carbon atoms can be employed with the aliphatic, straight, branched chain or cyclic glycols all being suitable. Thus, for example, cyclohexane dimethanol can be employed or an alkylene glycol containing 2–10 carbon atoms can be used. The preferred glycols are the polymethylene glycols such as ethylene glycol, butane-1,4-diol, hexane-1,6-diol, decane-1,10-diol, and the like, although the branched-chain glycols such as neopentyl glycol can also be used. The glycol can be employed either as the free glycol or as an ester thereof since the glycol itself is the functional portion in the initial ester interchange reaction with the dicarboxylate component. If desired, mixtures of glycols can also be used. Best results are obtained when the molar ratio of the glycol and diamine is 2–60 mole percent of the diamine and 98–40 mole percent of the glycol based on the dicarboxylate component.

The dicarboxylate component can be employed either as the free dicarboxylic acid or as an ester thereof since the ester groups are split off during the initial ester interchange and do not affect the course of the polymerization. Usually, the esters are desirably employed, although the polymer resulting therefrom is a condensation polymer of the free acid regardless of whether or not the dicarboxylate component is initially added as the free acid or as an ester. For convenience, the lower alkyl esters are desirably employed for ease in removing the alcohol liberated during the initial ester interchange. Thus, suitable dicarboxylate components include any of the N,N'-bis(p-carboxybenzoyl)alkylene diamines wherein the alkylene group contains 2–10 carbon atoms or any of the well known alkyl or aryl esters thereof. Thus, the N,N'-bis(p-carboxybenzoyl)alkylenediamines which are suitably employed include those wherein the alkylene diamine group is derived from ethylene diamine, tetramethylene diamine, hexamethylene diamine, decamethylene diamine, or similar compounds of the formula

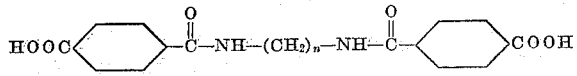

wherein $n$ is 2-10.

The polymerization proceeds in the usual manner involving an initial condensation of the dicarboxylate component with the glycol and with the diamine. Usually, the reaction between the dicarboxylate component and the diamine proceeds most readily whereby the entire amount of diamine added to the reaction mixture is used up and any excess glycol beyond that necessary to complete the interchange with the remaining dicarboxylate components can be distilled off. Thus, the composition of the polyester amides as regards the ratio of glycol to diamine is readily controlled by controlling addition of the diamine since the amount of glycol added will not change the ratio in the final polymer. The initial stage of the reaction is usually carried out at atmospheric pressure and a temperature of 100-300° C. and preferably 200-300° C. for best results, although lower or higher temperatures can be employed in some cases. During this initial stage of the process, monohydric alcohol is liberated when a dicarboxylate ester is employed or water when the free dicarboxylic acid is employed. For best results, the water or alcohol is removed from the reaction zone as it is liberated in order to promote the initial stage of the reaction. When a lower alkyl diester of the dicarboxylic acid component is employed, the liberated alcohol is volatile and therefore easily removed. If desired, however, higher alkyl or phenyl esters can be used.

The process is facilitated by use of an ester-interchange catalyst, a large number of such catalysts being known to the art. Typical ester-interchange catalysts which can be employed include the metal hydrides such as calcium hydride, lithium hydride, sodium hydride, or the like; metal oxides such as antimony trioxide, litharge, cerium oxide, germanium oxide and the like; double metal catalysts such as lithium aluminum stearate, calcium aluminum acetate and similar catalysts containing an alkali or alkaline earth metal and an amphoteric metal, alcoholates of one or more of such metals as sodium, potassium, lithium, calcium, titanium, tin, magnesium, aluminum, zinc, and the like, alkaline reacting salts such as borates and carbonates of the alkali metals, free metals such as sodium, potassium, lithium, calcium, cobalt, tin, germanium, cerium, magnesium, lead, antimony and the like as well as salts of these and similar metals and other well known ester-interchange catalysts such as zirconium compounds and the like. Particularly good results are obtained with the titanium compounds such as titanium butoxide, sodium hydrogen titanium ethoxide butoxide and the like, preferably together with water as a co-catalyst for low color formation. The catalyst or catalyst mixture is preferably employed in a concentration of at least 0.001% by weight based on the weight of reactants with amounts of 0.001% to 0.05% by weight being preferred. Larger amounts of catalyst can also be used although such larger amounts usually are not necessary for optimum results.

The initial stage of the reaction is usually complete in 5-30 minutes; and, if desired, the temperature can be raised or the pressure reduced at the end of the first stage to effect completion of the removal of the alcohol liberated during the initial stage. The polymerization is then effected to the desired degree by continuing the heating under reduced pressure at last until the resulting polyester-amide reaches an inherent viscosity of 0.4. The polymerization can be effected by first obtaining a low viscosity polymer in powder form and then continuing the polymer buildup in powder form under vacuum or by continuing the heating after the initial stage under reduced pressure whereby the polymer remains molten until the desired molecular weight and inherent viscosity is achieved.

The polymers obtained have varying degrees of crystallinity depending upon the molar amount of diamine employed in effecting the condensation. Generally, the use of increasing amounts of diamine lower the melting point somewhat although the melting point again rises as the quantity of diamine increases to amounts of 30-60 mole percent or higher based on the dicarboxylate component. The inherent viscosity also tends to decrease with increasing amounts of the diamine, and the polymers formed show much higher water susceptibility than do polymers prepared from the corresponding dicarboxylate component and glycol alone. Thus, the unmodified polyesters have very low water susceptibility whereas the polyester-amides of this invention have good water susceptibility which is both necessary and desirable in many applications such as for subbing photographic film, making water permeable coatings and interlayers. Furthermore, the inclusion of the diamine makes the resulting modified polyester-amides have increased utility for fiber applications since the increased water absorption results in fibers having a superior feel and also having greatly improved dye absorption properties.

The preparation of typical polyester-amides embodying the invention is illustrated by the following examples:

EXAMPLE 1

A mixture of 46.8 g. (0.1 mole) of N,N'-bis(p-carbethoxybenzoyl)hexamethylene diamine, 35.4 g. (0.3 mole) of hexane-1,6-diol, 1.16 g. (0.01 mole) of hexamethylene diamine and 0.5 ml. of sodium hydrogen titanium ethoxide butoxide solution was heated for 20 minutes at 245-275° C. and atmospheric pressure with continuous removal of the ethyl alcohol liberated during the initial stages of the reaction. Thereafter, the reaction mixture was heated for an additional 20 minutes at 275° C. and a pressure of 0.1-0.5 ml. whereby a nearly white, tough, solid polyester-amide was obtained having an inherent viscosity of 1.12 and a melting point of 257° C. This polymer thus contained a mole ratio of 10% diamine component and 90% glycol component based on the weight of the dicarboxylate component.

EXAMPLE 2

A higher melting polyester-amide containing 50 mole percent of diamine was prepared in similar fashion by reaction of 46.8 g. (0.1 mole) of N,N'-bis(p-carbethoxybenzoyl)hexamethylene diamine, 29.5 g. (0.25 mole) of hexane-1,6-diol and 5.8 g. (0.05 mole) of hexamethylene diamine using the catalyst described in the preceding example. The initial stage was effected by heating for 20 minutes at 245-275° C., and the polymerization was carried out by heating for 6 minutes at 275-300° C. followed by 14 minutes at 300° C. and a pressure of 0.1-0.5 mm. The resulting polyester-amide was an ivory white, tough, crystalline solid having an inherent viscosity of 0.65 and a melting point of 283° C.

EXAMPLE 3

The nature of the diamine can be varied as indicated herein with equally good results. Thus a mixture of 46.8 g. (0.1 mole) of N,N'-bis(p-carbethoxybenzoyl)-hexamethylene diamine, 35.4 g. (0.3 mole) of hexane-1,6-diol, 1.8 g. (0.03 mole) of ethylene diamine and 1 ml. of sodium hydrogen titanium ethoxide butoxide solution was heated for 20 minutes at 245-275° C. followed by 20 minutes at 275° C. and a pressure of 0.1-0.5 mm. The resulting polyester-amide containing 30 mole percent of the ethylene diamine component based on the dicarboxylate was an ivory white, tough, crystalline solid having an inherent viscosity of 0.73 and a melting point of 250° C. This polymer as well as the preceding polymers described in the examples could be extruded in the form of a film or fiber which could then be oriented and heat treated to give a tough article which had good moisture absorption and dyeability. When dissolved in a suitable solvent, the polymers were useful as subbings on photographic film base prepared from the unmodified polyester.

The data shown in Table I illustrates the effect of increasing amounts of hexamethylene diamine in the condensation with an ester of N,N'-bis(p-carboxybenzoyl)-hexamethylene diamine and hexane-1,6-diol. The mole percent of diamine is based on the dicarboxylate content, and the polymer thus contains the mole percent of diamine shown and 100 minus the amount of diamine as the mole percent of the glycol.

Table I

STAGE II

| Mole Percent diamine | Time (min.) | Temp. °C. | Inherent viscosity | Melting point °C. |
|---|---|---|---|---|
| 0 | 20 | 275 | 1.01 | 265 |
| 2 | 20 | 275 | 1.10 | 261 |
| 5 | 20 | 275 | 1.08 | 260 |
| 10 | 20 | 275 | 1.12 | 257 |
| 20 | 20 | 275 | 1.01 | 257 |
| 30 | 20 | 275 | 0.62 | 259 |
| 40 | 20 | 275 | 0.64 | 261 |
| 50 | 20 | 275–300 | 0.65 | 283 |
| 50 | 20 | 300 | Insol. | 284 |
| 100 | 10 | 325 | Insol. | [1] 335 |

[1] Decomposed.

When the diamine was employed in a mole percent of 100, i. e. when the glycol had been completely replaced so that a polyamide was formed, the polymer crystallized during the initial stage and the second stage was carried out on the solid material. As can be seen, the polyamide is a quite insoluble material having an extremely high melting point which makes it undesirable for commercial applications.

Similar data is presented in Table II employing varying amounts of ethylene diamine instead of the hexamethylene diamine employed in the processes set out in Table I.

Table II

STAGE II

| Percent diamine | Time (min.) | Temp. °C. | Inherent viscosity | Melting point °C. |
|---|---|---|---|---|
| 0 | 20 | 275 | 1.01 | 265 |
| 2 | 20 | 275 | 0.89 | 263 |
| 5 | 20 | 275 | 0.75 | 256 |
| 10 | 20 | 275 | 0.73 | 257 |
| 20 | 20 | 275 | 0.79 | 255 |
| 30 | 20 | 275 | 0.73 | 250 |
| 30 | 30 | 275 | [1] 1.04 | 246 |
| 40 | 20 | 275 | 0.60 | 254 |
| 40 | 35 | 275 | [2] 0.76 | 205 |
| 50 | 20 | 275 | 0.30 | 227 |
| 50 | 30 | 275 | [2] 1.17 | 217 |
| 60 | 30 | 275 | [2] 1.21 | 227 |
| 70 | 25 | 290 | [2] Insol. | 250 |
| 80 | 13 | 300 | [2] Insol. | 200 |

[1] Polymer crystallized very slowly.
[2] Amber glass.

If the concentration of ethylene diamine was increased from 2 to 50%, there was a steady drop in the inherent viscosity of the crystalline polymer. The melting point decreased slowly up to 40% diamine and then dropped sharply at 50%. When polymerization mixtures containing more than 30% diamine were run using a longer polymerization time, the resulting polymers were amber glasses with only small scattered crystalline regions. The melting points of these glasses were lower than those of the corresponding crystalline polymers, but their inherent viscosities were higher. Also, the water susceptibility of the glasses was greater than that of the crystalline polymers.

Thus by means of this invention modified polyesters are obtained by inclusion of a diamine to form a polyester-amide, and this effect of the added free diamine proved to be quite different from the effect of the internal amide linkages in the dicarboxylate component.

Although the invention has been described in detail with particular reference to certain preferred embodiments thereof, variations and modifications can be effected within the spirit and scope of the invention as described hereinabove and as defined in the appended claims.

We claim:

1. A highly polymeric linear polyester-amide of N,N'-bis(p-carboxybenzoyl)hexamethylene diamine, a polymethylene glycol containing 2–10 carbon atoms, and an alkylene diamine containing 2–6 carbon atoms, said glycol and diamine components being in a molar ratio of 2–60 mole percent of said 2–6 carbon atom unsubstituted alkylene diamine to 98–40 mole percent of said glycol based on said N,N'-bis(p-carboxybenzoyl)hexamethylene diamine, said polyester-amide having an inherent viscosity of at least 0.4.

2. A highly polymeric linear polyester-amide of N,N'-bis(p-carboxybenzoyl)hexamethylene diamine, hexane-1,6-diol, and hexamethylene diamine wherein the molar ratio of said diol and diamine components is 2–60 mole percent of said unsubstituted hexamethylene diamine and 98–40 mole percent of said glycol based on said N,N'-bis(p-carboxybenzoyl)hexamethylene diamine, said polyester-amide having an inherent viscosity of at least 0.4.

3. A highly polymeric linear polyester-amide of N,N'-bis(p-carboxybenzoyl)hexamethylene diamine, hexane-1,6-diol, and ethylene diamine wherein the molar ratio of said diol and diamine is 2–60 mole percent of said ethylene diamine and 98–40 mole percent of said glycol based on said N,N'-bis(p-carboxybenzoyl)hexamethylene diamine, said polyester-amide having an inherent viscosity of at least 0.4.

References Cited in the file of this patent

UNITED STATES PATENTS 2,071,250    Carothers _____ Feb. 16, 1937